Jan. 3, 1956 C. G. KRONMILLER 2,729,719
CONTROL DEVICE

Filed July 24, 1953 2 Sheets-Sheet 1

INVENTOR.
CARL G. KRONMILLER
BY George H. Fisher
ATTORNEY

Jan. 3, 1956  C. G. KRONMILLER  2,729,719
CONTROL DEVICE
Filed July 24, 1953  2 Sheets-Sheet 2
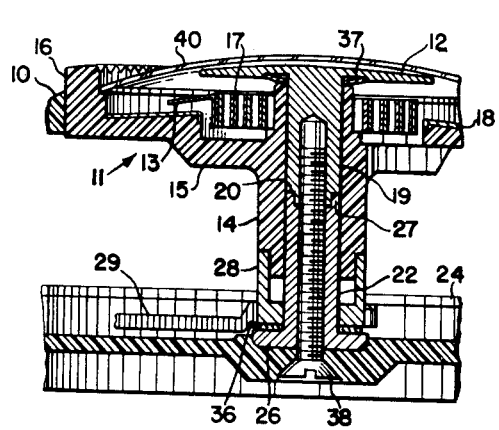
FIG. 4
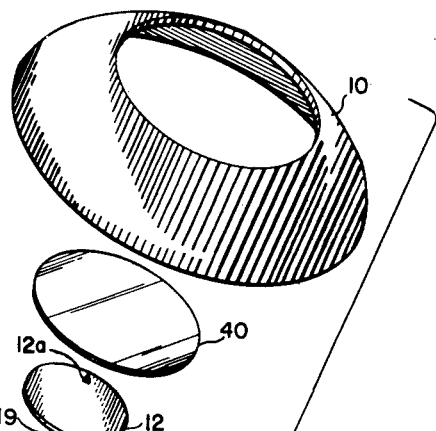
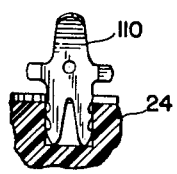
FIG. 6
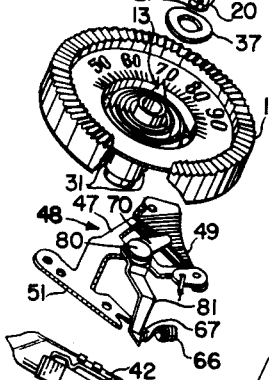
FIG. 5
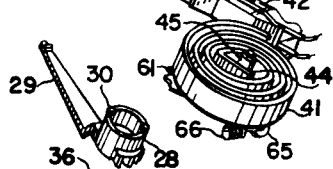
FIG. 7
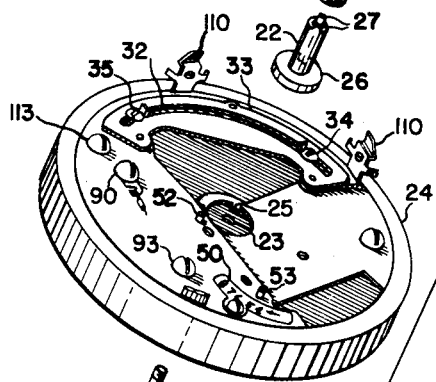
INVENTOR.
CARL G. KRONMILLER
BY
George H Fisher
ATTORNEY

United States Patent Office 2,729,719
Patented Jan. 3, 1956

2,729,719

CONTROL DEVICE

Carl G. Kronmiller, Minneapolis, Minn., assignor to Minneapolis-Honeywell Regulator Company, Minneapolis, Minn., a corporation of Delaware Application July 24, 1953, Serial No. 370,029

24 Claims. (Cl. 200—138)

This invention is concerned with an improved condition control device and in particular an improved bimetal actuated room thermostat.

It is an object of the present invention to provide an improved control device having a base upon which the active bimetal is mounted in controlling relation to a mercury switch with the position of the bimetal element relative to the base being controlled by a control point adjustment means which includes a temperature scale, the improved control device also having indicators cooperating with the temperature scale to indicate ambient temperature and to indicate control point setting.

It is also an object of the present invention to provide an improved thermostat having a flat base member adapted to be mounted in a vertical position and having a first and a second post assembly mounted substantially normal to the base with a gear drive connecting the two post assemblies to transmit movement of one assembly to the other, the improved thermostat also having a bimetal and switch means secured to one of the post assemblies and having control point adjustment means secured to the other post assembly.

It is a further object of the present invention to provide a control device having a temperature responsive control and a manually rotatable member for adjusting the control point of the temperature responsive control, the movable member having a temperature scale and a thermometer to indicate ambient temperature, and a fixed part extending axially through the rotatable member and cooperating with the temperature scale to indicate the control point setting.

Figure 1:
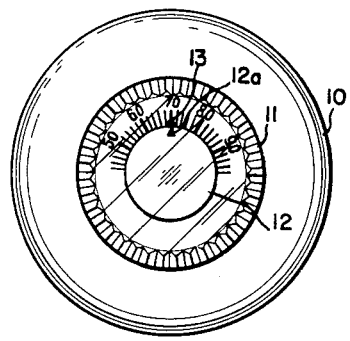
Figure 2:
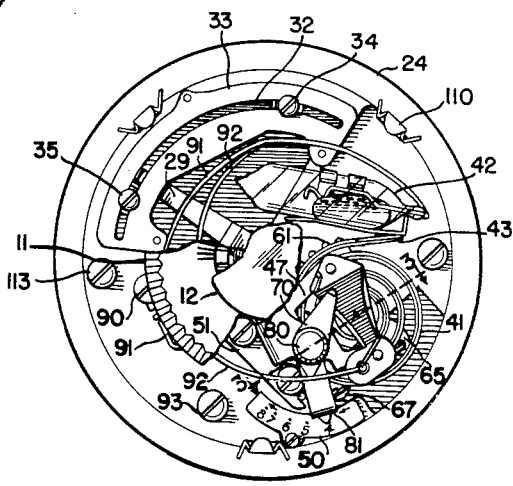
Figure 3:
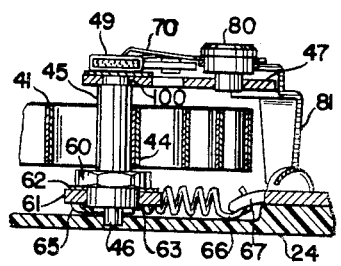
Figure 8:
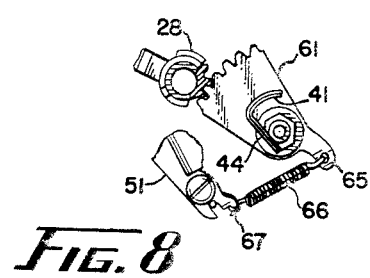

These and other objects of the present invention will become apparent upon reference to the following description, appended claims and from the drawings in which:

Figure 1 is a front elevation of the improved control device,

Figure 2 is a front elevation of the improved control device with the decorator ring removed and with the control point adjustment means, temperature scale, and control point indicator disk partially broken away, Figure 3 is an enlarged section taken along the line 3—3 of Figure 2, Figure 4 is an enlarged section view taken through the post assembly supporting the temperature scale and control point adjustment means, Figure 5 is an exploded perspective view of the improved control device, Figure 6 is a view of the cover retaining spring clip with a portion of the base member shown in section, Figure 7 is a view of the cover, spring clip, and base member, with the cover and base member shown in section, and Figure 8 is a plan view of the two gear sectors of the control device.

The external appearance of this control device is similar to the thermostat illustrated in a copending application for design patent by Henry Dreyfuss, Serial No. D. 25,258.

Referring to Figure 1, the improved control device or thermostat is shown as it would appear mounted in a vertical position upon a wall. The reference numeral 10 identifies a decorator ring or cover, more clearly shown in Figure 5. A manually rotatable control point adjustment knob 11 is also shown. The adjustment knob 11 includes a temperature scale, which temperature scale cooperates with an indicator 12a to indicate the control point setting and cooperates with a pointer 13 to indicate the ambient temperature of the space surrounding the thermostat.

Referring to Figure 4, a showing is made of the control point adjustment knob 11 in section. This adjustment knob 11 may be constructed of a plastic insulating material and has a central hub 14 from which a plurality of arms 15 radiate to support an annular up-raised ring 16 having a serrated surface on the upper edge thereof of facilitate manual adjustment. The manner in which arms 15 connect the hub 14 to the annular up-raised portion 16 can be seen in Figure 5. This manner of construction of knob 11 allows free circulation of air currents from under the hub 14 through the spaces between arms 15 to the space above the hub. An ambient temperature responsive bimetal coil 17 is mounted in fixed relation to the hub 14 and mounts indicator 13, which indicator extends away from hub 14 and can be viewed as shown in Figure 1, the indicator 13 extending out from under disk 12. The temperature scale as shown in Figure 1 may be formed on a metallic plate 18, which plate is pressed into a predetermined position with respect to recesses 31 and moves with the control point adjustment knob 11.

The control point indicator may be constructed of metal and has a post portion 19 extending from the under side of a disk portion 12. Upon reference to Figure 5 it can be seen that this post portion 19 has a shoulder 20 in which is formed a recess 21. While it is not shown in Figure 5, the stem 19 has a second recess formed in the shoulder 20 and displaced 180° from the recess 21 shown in the Figure 5.

The above mentioned control point disk 12 and control point adjustment knob 11 form a part of a post assembly. This post assembly includes a positioning member 22 which mates with a recess 23 formed in base member 24. This can be seen more clearly by reference to Figure 5. In Figure 5 the shape of recess 23 can be seen to include a projection 25. This projection 25 is adapted to mate with a recess formed in the lower flange portion 26 of the positioning member 22. The recess in this lower portion 26 is shown by broken lines in Figure 5.

Projections 27 are formed in the upper portion of positioning member 22 and, as shown in Figure 4, these projections 27 are adapted to mate with the recesses 21 in the control point indicator. From this it can be seen that the control point disk 12 is mounted in a fixed position relative to base 24 by means of the recesses 21 in stem 19, the projections 27 on positioning member 22, and the projection 25 formed in base member 24.

A gear sector 28 also forms part of the post assembly and as shown in Figure 5 this gear sector has an arm 29 radiating therefrom and has a pair of projections 30 formed in the upper surface of a cylindrical portion thereof. These projections 30 are adapted to mate with recesses 31 formed in the hub portion 14 of control point knob 11 to form a sleeve about post 19. One of the recesses 31 is shown by full lines in Figure 5.

From Figure 4 it can be seen that the gear sector 28 is pivotally mounted on positioning member 22. Therefore, movement of the control point adjustment knob 11 causes rotation of the temperature scale 18 and bimetal coil 17 and also causes rotation of the gear sector 28.

Upon reference to Figure 2, it can be seen that the outer portion of arm 29 mates with an opening 32 formed in a metal plate 33, which plate is fastened rigidly to the base member 24. Adjustable stops 34 and 35 are provided to limit movement of arm 29. These adjustable stops can be moved to any position along opening 32 and can be tightened to stay in this position and in this manner the movement of arm 29 is restricted to the arc between the stops 34 and 35. This therefore limits the range of adjustment which can be had by rotation of the control point adjustment knob 11.

In assembling the portion of the control device shown in Figure 4 a friction washer 36 is provided between the gear sector 28 and flange portion 26 and a spring washer 37 is placed between the upper portion of the hub 14 of adjustment knob 11 and the underside of the disk portion 12 stationary control point indicator. A screw 38 extends through an opening in the recess 23 in base member 24, through the positioning member 22, through the friction washer 36, and mates with screw threads formed in the post 19 of control point indicator. Therefore, upon screw 38 being tightened the spring washer 37 is deformed and applies pressure to both the under side of the disk 12 and to the top surface of the hub 14 to thereby exert a friction force between the stationary disk 12 and the movable adjustment knob 11 which force tends to prevent relative movement between disk 12 and knob 11. This force tends to maintain the control knob 11 in any desired position once it is manually moved to this position. The friction between the knob 11 and the under side of disk 12 as well as the friction exerted where gear sector 28, washer 36, and the lower portion 26 of member 22 engage prevents the rotation of knob 11 except when this force is overcome by manual movement of the knob 11.

Figure 4 also shows a transparent member 40 carried by knob 11 which covers the control point indicator, the temperature scale 18 and the bimetal coil 17 to protect these components from tampering and from dust particles.

Referring to Figure 2, a spiral bimetal coil 41 is shown mounting a mercury tube switch 42, with the mercury switch being attached to the outer end 43 of the bimetal coil. Upon reference to Figures 3 and 8, it can be seen that inner end 44 of the bimetal coil 41 is rigidly secured to a metallic shaft 45 capable of conducting heat. The lower end 46 of the shaft 45 is journalled in the base member 24 while the upper end 100 is journalled in a bracket 47 forming a part of the heat anticipating resistor assembly 48, as shown in Figure 5. Shaft 45, as shown in Figure 3, is mounted substantially normal to base 24.

In Figure 5 the heat anticipating resistor 49 is shown and it can be seen that this resistor is a non-linear resistor, that is, the resistance change per unit length of the resistor is not uniform. In actual construction it has been found desirable to wind this resistor so that its resistance per unit length of the resistor increases in approximately the manner of a square function. This allows for a more uniform and readable scale, shown as 50 in Figure 2, to be later explained.

The bracket 47 is formed of a metal having good heat conductivity and includes a base member 51, which base member is adapted to be mounted to the base member 24 and positioned with respect to base member 24 by lugs 52 and 53 formed in base member 24.

Since the bracket 47 is formed of metal having good heat conductivity and since shaft 45 is likewise formed of metal capable of conducting heat, the heat generated by anticipating heater 49 is conducted from bracket 47 to shaft 45 and thereby to bimetal 41 to affect this bimetal in a manner well known in the art.

In the manufacture of shaft 45 a hexagonal portion 60 is machined out of the stock from which the shaft 45 is produced and this portion is adapted to receive a wrench to thereby turn the shaft 45. Mounted on shaft 45 is a second gear sector 61 which is in the form of a metal plate having gear teeth which mate with the gear sector 28. This second gear sector is the means by which motion of gear sector 28, caused by rotation of adjustment knob 11, is transmitted to the bimetal coil 41.

This gear sector 61 is mounted in frictional engagement with the shaft 45 and this mounting is accomplished by inserting a spring washer 62 between the hexagonal portion 60 and gear sector 61 and then ring staking the under portion of shaft 45 to deform the under portion as shown at 63 and thereby hold gear sector 61 in frictional engagement with the shaft 45.

The purpose of hexagonal portion 60 formed in shaft 45 is to provide a calibration adjustment for the control device. It can be seen from the above description that with bimetal 41 at a given temperature, the position of mercury switch 42 bears a definite relation to base 24 for each setting of knob 11. If the device is properly calibrated, mercury switch 42 will just close the electrical circuit when knob 11 is set so that indicator 12a points to the given temperature of bimetal 41. However if the circuit closing action of switch 42 does not occur when indicator 12a points to the given temperature, the device is off calibration. It is then necessary to insert a wrench to engage hexagonal portion 60 and turn shaft 45 in an appropriate direction to vary the position of the shaft relative to gear sector 61. Thus the circuit closing action of switch 42 can be made to occur when indicator 12a points to the given temperature of bimetal 41 as indicated on scale 18. This has the effect of changing the temperature at which the mercury switch 42 opens or closes the circuit which it is controlling.

Gear sector 61 has an eyelet 65 extending therefrom and this eyelet is connected by means of spring 66 to an eyelet 67 formed in the base member 51 of bracket 47. In the exploded view of Figure 5 spring 66 is shown as being broken in the center. In Figure 8 the spring 66 is more clearly shown as it connects to gear sector 61 and base member 51.

The function of spring 66 is to bias gear sector 61 for clockwise rotation and thereby eliminate backlash. However, the force exerted by spring 66 is not sufficient to cause rotation of gear sector 28 due to the frictional force of washer 37, above mentioned.

Considering once again the anticipating heater 49, Figures 3 and 5 show that a spring biased metallic tap 70 engages the anticipating heater and is movable across the length of the heater. This tap 70 is mounted on the bracket 47 and is rotatable with respect thereto. Electrical connection is established from movable tap 70 to offset arm 47 by means of post 80. An indicating arm 81 is rigidly connected to tap 70 and is movable therewith. Indicating arm 81 cooperates with scale 50, shown in Figures 2 and 5, and this arm is set to a scale value approximately equal to the value of current which the control device is controlling. Scale 50 is calibrated in tenths of an ampere and if the current flowing through the mercury switch 42 is for example .5 of an ampere when the switch is closed, then the arm 81 is set to the .5 position as shown on scale 50.

In a thermostat having an anticipating heater it is desirable to maintain the power dissipation of the heater substantially constant. If the thermostat is to be used to control currents of varying magnitudes it is necessary to provide for increasing or reducing the value of the heater resistance to maintain this power substantially constant. It is well known that the power varies linearly with resistance and varies as the square of the current through the resistor. Therefore the provision of a heater which is wound so that the resistance increase versus length of adjustment approximates a square function gives a scale 50 which is more readable and is a more nearly linear scale than it would be if a linear anticipating heater were used.

It is recognized that the setting of arm 81 to the value of the current being controlled in a given installation may give periods of burner operation which are longer or shorter than desired due to the characteristics of the given installation. In this case arm 81 may be moved to a lower scale setting to increase the power dissipated by the anticipating heater 49, or the arm 81 may be moved to a higher scale setting to decrease the power dissipated by the heater. This has the effect of decreasing or increasing, respectively, the length of the burner operating period.

Referring to Figure 2, the electrical circuit of the control device can be traced from screw 90 through conductor 91, mercury switch 42, conductor 92, heater 49, movable tap 70, post 80 and 47 to the base 51 of the bracket 47. The base 51 is connected to terminal screw 93 by means of a conductor mounted on the under side of base member 24. Screw 90 is connected to a terminal screw 113 by means of a conductor mounted on the under side of base member 14. Therefore, the two terminals to which electrical connection is made are terminal screws 93 and 113.

Figures 6 and 7 show spring clips 110, of which there are three, as shown in Figure 2 and Figure 5, one of the clips being broken away in Figure 5. Spring clip 110 is formed to have teeth in the lower portion thereof. The lower portion of the spring clip is inserted into a recess in base member 24, there being a recess for each of the three spring clips, and the teeth frictionally engage the base member, as shown in Figure 6. As seen in Figure 7, the internal contour of cover 10 is such that the upper portion of the spring clip engages a surface of the cover which is substantially normal to the base member 24. The spring clip is deformed inwardly as the cover 10 is placed in position and the cover is thereby frictionally held in position. The spring clip 110 is provided with a pair of arms or abutments which determine the position of cover 10 and hold the cover away from base member 24 to allow air to circulate between the cover and base member.

Various other modifications other than the one shown and described will be apparent to those skilled in the art and the scope of the invention therefore is to be limited only by the scope of the appended claims.

I claim as my invention:

1. A thermostat comprising; a base adapted to be mounted in a vertical position, a first rotatable post member mounted substantially normal to said base and mounting a first bimetal element, a mercury tube switch mounted by said first bimetal element in a substantially horizontal position and movable by said first bimetal element, a second movable post member mounted substantially normal to said base, drive means to transmit the rotational movement of said second post member to said first post member to thereby change the position of said first bimetal and said mercury switch, manually rotatable control point adjustment means mounted in a fixed manner to said second post member such that adjustment of said control point causes rotational movement of said second post member, said control point adjustment means having a temperature scale mounted thereon and having a second bimetal element controlling first indicating means cooperating with said scale, said scale and second bimetal element being rotatable with said control point adjustment means, and second indicating means cooperating with said temperature scale, said second indicating means being mounted in fixed relationship to said base member.

2. A control device comprising a base member, a first support member mounted on and movable with respect to said base member, a first bimetal element mounted on said first support member and movable therewith, control means controlled in accordance with the position of said first bimetal with respect to said base member, a second support member mounted on and movable with respect to said base member, drive means to transmit movement of said second support member to said first support member to thereby vary the position of said first bimetal as said second support member is moved, manually movable control point adjustment means mounted on said second support member so that adjustment of said adjustment means causes movement of said second support member, said movable control point adjustment means having a temperature scale thereon and having a second bimetal including first indicating means mounted on said adjustment means, said first indicating means cooperating with said temperature scale to indicate ambient temperature, and second indicating means fixed to said base member and cooperating with said temperature scale to indicate the control point setting.

3. A thermostat comprising, a substantially flat base member; a post assembly mounted substantially normal to said base member and comprising a first movable gear sector, manually movable control point adjustment means mounted on and in fixed relation to said gear sector, said control point adjustment means having a temperature scale thereon, a first bimetal element mounted on said control point adjustment means and cooperating within said temperature scale to indicate ambient temperature, and control point indicating means mounted in fixed relation to said base member and cooperating with said temperature scale to indicate control point setting; a movable shaft mounted substantially normal to said base, a second gear sector frictionally mounted on said shaft and in engagement with said first gear sector so that movement of said control point adjustment means and said first gear sector causes movement of said second gear sector and said shaft, a second bimetal rigidly mounted on said shaft, switching means controlled in accordance with the position of said second bimetal relative to said base, and manually operable calibrating means adapted to override the friction between said second gear sector and said shaft to thereby cause relative movement between said second gear sector and said shaft.

4. A thermostat comprising, a base member, a first post assembly mounted on said base member and including a first rotatable gear sector and manually movable control point adjustment means, movement of said control point adjustment means causing rotation of said first gear sector; a second rotatable post assembly mounted on said base member and including a second gear sector in mesh with said first gear sector to thereby cause rotation of said second post assembly upon movement of said control point adjustment means, a bimetal element rigidly mounted on said second post assembly and rotatable therewith, switch means controlled by said bimetal element in accordance with the position of said bimetal element with respect to said base member; and an anticipating heater assembly mounted on said base member in close proximity to said bimetal element and including a wire wound heater having an adjustable tap to vary the effect of said heater upon said bimetal.

5. A thermostat comprising, a substantially flat base member adapted to be mounted in a vertical position, a post member mounted in fixed relation on said base member substantially normal to said base member, a first gear sector having an arm, adjustable means mounted on said base member to restrict the movement of said arm, said first gear sector being mounted on said post member and rotatable with respect to said post member, manually rotatable control point adjustment means mounted in fixed relationship on said first gear sector, said control point adjustment means including a scale having indicia of temperature thereon, a first coil of bimetal mounted on said control point adjustment means, said first coil of bimetal cooperating with said scale to indicate ambient temperature, indicating means mounted in fixed relation on said post member and cooperating with the scale on said control point adjustment means to indicate control point setting; a metallic support member having good heat conductivity mounted in fixed relation as said base and having an offset arm portion extending substantially parallel to said base member, an anticipating heater mounted on said offset arm, a movable metallic shaft having good heat conductivity and having one end journalled in said base member and the other end journalled in said offset arm, said shaft extending substantially normal to said base member, a second coil of bimetal mounted in fixed relationship on said shaft, a mercury tube switch mounted on said second coil of bimetal in a substantially horizontal position and movable with movement of said second coil of bimetal, a second gear sector in engagement with said first gear sector and frictionally mounted on said shaft so that rotational movement of said first gear sector due to rotation of said control point adjustment means causes movement of said bimetal and mercury switch through said shift and said second gear sector, and calibrating means adapted to override the frictional engagement between said shaft and second gear sector to vary the position of said mercury switch with respect to said base member.

6. A thermostat comprising, a substantially flat base adapted to be mounted in a vertical position, first and second rotatable post assemblies mounted substantially normal to said base, said first and second post assemblies being spaced from each other and being connected by a gear drive so that rotational movement of either of said post assemblies is transmitted to the other, a first bimetal secured to said first post assembly, mercury tube switch means mounted on said first bimetal in a substantially horizontal position and movable by movement of said first bimetal, control point adjustment means including a temperature scale and a second bimetal cooperating with said scale to indicate ambient temperature, said control point adjustment means being mounted on said second post assembly and rotatable therewith, and control point indicating means rigidly mounted on said base and cooperating with said temperature scale to indicate control point setting.

7. A control device comprising, a base, a manually positionable member pivotally mounted on said base, temperature responsive control means including a first temperature sensitive element and the control point of which is adjusted by rotation of said member, a post extending axially through said member and secured at its inner end to said base, a scale on said member comprising indicia of temperature arcuately disposed about the pivotal axis of said member, an index on said post cooperating with the indicia on said scale, and a thermometer carried by said member and including a further temperature sensitive element cooperating with said scale to indicate ambient temperature.

8. A control device comprising, a base, a thermostat carried by said base and including a member movable to adjust the control point thereof, a post secured to said base and extending outwardly therefrom, a sleeve rotatably mounted on said post, means interconnecting said sleeve and said thermostat adjusting member so that rotation of said sleeve adjusts the control point of said thermostat, a disc on the outer end of said post preventing axial movement of said sleeve away from said base, a scale on said sleeve comprising indicia of temperature arcuately disposed about the pivotal axis of said sleeve, said scale being on a surface of said sleeve substantially normal to the pivotal axis thereof, an index on said disc cooperating with said scale to indicate selected control point, a spiral bimetal carried by said sleeve and carrying an index extending radially beyond its periphery and the periphery of said disc and cooperating with said scale to indicate ambient temperature, said spiral bimetal being disposed axially below said disc and having a maximum radius less than said disc, and manually positionable means on said sleeve in the form of a ring radially beyond said scale and extending axially beyond said scale with respect to said base.

9. A control device comprising, a base, a thermostat carried by said base and including a member movable to adjust the control point thereof, a post secured to said base and extending outwardly therefrom, a sleeve pivotally mounted on said post, means interconnecting said sleeve and said thermostat adjusting member so that rotation of said sleeve adjusts the control point of said thermostat, an index on the outer end of said post, a scale bearing indicia of temperature on said sleeve and disposed to cooperate with said index to indicate the selected control point of said thermostat, and a thermometer carried by said sleeve and cooperating with said scale to indicate ambient temperature.

10. A control device comprising, a generally flat base adapted for vertical mounting on a wall, a bracket secured to said base having a portion extending in spaced relation and parallel thereto, a shaft journaled in said base and in said bracket portion, a bimetal element having a first end secured to said shaft, a switch actuated by the second end of said bimetal element, means for angularly positioning said shaft with respect to said base to determine the temperature at which said bimetal element actuates said switch, and an anticipating heater secured to said bracket adjacent the portion thereof in which said shaft is journaled.

11. A control device comprising, a generally flat base adapted for vertical mounting on a wall, a bracket secured to said base having a portion extending in spaced relation and parallel thereto, a shaft journaled in said base and in said bracket portion, a bimetal element having a first end secured to said shaft, a switch actuated by the second end of said bimetal element, means for angularly positioning said shaft with respect to said base to determine the temperature at which said bimetal element actuates said switch, an electrical resistance winding secured to said bracket on the side thereof opposite said bimetal and overlying the portion of said bracket in which said shaft is journaled, and a slider pivoted in said bracket and engaging said winding to select the effective portion thereof.

12. A control device comprising a base, a manually positionable member pivotally mounted on said base, temperature responsive control means the control point of which is adjusted by rotation of said member, a post extending through said member and non-rotatably secured at its inner end to said base, a scale on said member comprising indicia of temperature arcuately disposed about the pivotal axis of said member, and an index on said post cooperating with the indicia on said scale.

13. A control device comprising, a base, a thermostat carried by said base and including a member movable to adjust the control point thereof, a post non-rotatably secured to said base and extending outwardly therefrom, a sleeve rotatably mounted on said post, means interconnecting said sleeve and said thermostat adjusting member so that rotation of said sleeve adjusts the control point of said thermostat, a disc on the outer end of said post preventing axial movement of said sleeve away from said base, a scale on said sleeve comprising indicia of temperature arcuately disposed about the pivotal axis of said sleeve, said scale being on a surface of said sleeve substantially normal to the pivotal axis thereof, an index on said disc cooperating with said scale to indicate a selected control point, and manually positionable means on said sleeve in the form of a ring radially beyond said scale and extending axially beyond said scale with respect to said base.

14. A control device comprising, first and second members relatively rotatable on a pivotal axis, a thermostat the control point of which is adjusted by relative rotation of said members, said thermostat including a switch of the type having an appreciable operating differential, a sensing element and an anticipating heater for said element controlled by said switch, a scale plate disposed transversely of the pivotal axis carried by one of said members and having indicia of temperature thereon arcuately disposed about the pivotal axis, an index on the other of said members cooperating with said indicia, and temperature indicating means including a bimetal sensing element carried by the one of said members which carries said scale plate, said element being so located as to be relatively unaffected by said anticipating heater, and a pointer positioned thereby to move arcuately about the pivotal axis of said members and cooperate with said indicia to indicate ambient temperature.

15. A control device comprising, first and second members relatively rotatable on a pivotal axis, temperature responsive control means including a first temperature sensitive element and the control point of which is adjusted by relative rotation of said members, a scale plate disposed transversely of the pivotal axis carried by one of said members and having indicia of temperature thereon arcuately disposed about the pivotal axis, an index on the other of said members cooperating with said indicia, and temperature indicating means including a further temperature sensing element carried by the one of said members which carries said scale plate and a pointer positioned thereby to move arcuately about the pivotal axis of said members and cooperate with said indicia to indicate ambient temperature.

16. A control device comprising, first and second members relatively rotatable on a pivotal axis, temperature responsive control means including a first temperature sensitive element and the control point of which is adjusted by relative rotation of said members, a scale plate disposed transversely of the pivotal axis carried by one of said members and having indicia of temperature thereon arcuately disposed about the pivotal axis, an index on the other of said members cooperating with said indicia, a further temperature responsive element in the form of a spiral bimetal carried at one of its ends on the one of said members which carries said scale plate and coaxially disposed with respect to the pivotal axis of said members, and a pointer on the other end of said spiral bimetal cooperating with said indicia to indicate ambient temperature.

17. A unitary air condition responsive device comprising, in combination, a round base, air condition responsive means mounted upon said base, control means actuated by said air condition responsive means, a circular convex shaped cover for enclosing said responsive means having its center substantially coinciding with the center of said base, the cover comprising a stationary portion and a rotatable portion having a circular periphery, the axis of rotation of said rotatable portion coinciding with the center of said cover as a whole, a scale having indicia of condition value carried by the rotatable portion of said cover and arcuately disposed about the axis of rotation, an index in fixed relation to said base cooperating with said scale, and means actuated by said rotatable cover portion for adjusting the value of the condition at which said air condition responsive means actuates said control means.

18. A unitary air condition responsive device comprising, in combination, a round base, air condition responsive means mounted upon said base, control means actuated by said air condition responsive means, a circular convex shaped cover for enclosing said responsive means having its center substantially coinciding with the center of said base, the cover comprising a stationary portion and a rotatable portion having a circular periphery, the axis of rotation of said rotatable portion coinciding with the center of said cover as a whole, a scale having indicia of condition value carried by the rotatable portion of said cover and arcuately disposed about the axis of rotation, an index in fixed relation to said base cooperating with said scale, means carried by the rotatable cover portion cooperating with said scale to indicate ambient condition value, and means actuated by said rotatable cover portion for adjusting the value of the condition at which said air condition responsive means actuates said control means.

19. A control device comprising, a round base, a thermostat on said base, first and second members relatively rotatable on an axis normal to the center of said base, the control point of said thermostat being adjusted by relative rotation of said members, a circular scale plate carried coaxially of said members by one of said members in spaced relation to said base and transversely of the pivotal axis, said scale plate having indicia of temperature thereon arcuately disposed about the pivotal axis, an index on the other of said members cooperating with said indicia, temperature indicating means including a sensing element carried by the one of said members that carries said scale plate and a pointer positioned thereby to move arcuately about the pivotal axis of said members and cooperate with said indicia to indicate ambient temperature, a circular convex shaped cover for enclosing said thermostat having its center substantially coinciding with the center of said base, said cover comprising an annular portion carried directly by said base and a central circular portion covering said scale plate and supported by the member that carries said scale plate.

20. A control device comprising, a generally flat base adapted for vertical mounting on a wall, a bracket secured to said base having a portion extending in spaced relation and parallel thereto, a shaft journaled in said base and in said bracket portion, a bimetal element having a first end secured to said shaft, a switch actuated by the second end of said bimetal element, means for angularly positioning said shaft with respect to said base to determine the temperature at which said bimetal element actuates said switch, and an adjustable anticipating heater secured to said bracket adjacent the portion thereof in which said shaft is journaled comprising an electrical resistance winding, a slider pivoted on said bracket, engaging said winding to select the effective portion thereof, a scale plate with indicia and an index positioned by said slider cooperating with said scale plate.

21. A control device comprising, a generally flat base adapted for vertical mounting on a wall, a bracket secured to said base having a portion extending in spaced relation and parallel thereto, a shaft journaled in said base and in said bracket portion, a bimetal element having a first end secured to said shaft, a switch actuated by the second end of said bimetal element, means for angularly positioning said shaft with respect to said base to determine the temperature at which said bimetal element actuates said switch, and an adjustable anticipating heater secured to said bracket adjacent the portion thereof in which said shaft is journaled, means for adjusting said heater, a circular convex shaped cover for enclosing said thermostat having its center substantially coinciding with the center of said base, said cover comprising an annular portion and a center portion, said heater adjusting means being located beneath the annular portion of said cover so that adjustment of said anticipating heater is readily available upon removal of said annular cover portion.

22. A control device comprising, first and second members relatively rotatable on a pivotal axis, temperature responsive control means the control point of which is adjusted by relative rotation of said members, scale means on a surface of one of said members disposed transversely of the pivotal axis and having indicia of temperature arcuately disposed about the pivotal axis, said one member comprising a housing having a transparent front portion axially spaced from said scale, an index on the other of said members cooperating with said indicia, and temperature indicating means including a spiral bimetal element within said housing attached at one end to said member which carries said scale means, a disc within said housing covering said spiral bimetal element, the second end of said bimetal element having a pointer extending beyond said disc and cooperating with said scale indicia, said housing being vented on its rear portion adjacent said spiral bimetal element to allow for the circulation of air over said bimetal element.

23. A control device comprising, first and second members relatively rotatable on a pivotal axis, temperature responsive control means the control point of which is adjusted by relative rotation of said members, scale means on a surface of one of said members disposed transversely of the pivotal axis and having indicia of temperature arcuately disposed about the pivotal axis, said one member comprising a housing having a transparent front portion axially spaced from said scale, an index on the other of said members cooperating with said indicia, and temperature indicating means including a spiral bimetal element within said housing attached at one end to said member which carries said scale means, and coaxially disposed with respect to the pivotal axis of said members, a disc within said housing covering said spiral bimetal element, the second end of said bimetal element having a pointer extending between said disc and said scale and radially beyond said disc to cooperate with said indicia, said housing being vented on its rear portion in an area beneath said disc to allow for circulation of air.

24. A control device comprising, a base, a support member mounted on and movable with respect to said base member, a first bimetal element mounted on said support member and movable therewith, control means controlled in accordance with the position of said first bimetal element with respect to said base member, a manually positionable member pivotally mounted on said base, drive means to transmit rotation of said manually positionable element to said support member, said first bimetal element and said control means constituting temperature responsive control means the control point of which is adjusted by rotation of said manually positionable member, a post extending axially through said manually positionable member and secured at its inner end to said base, indicia means including a scale means comprising indicia of temperature arcurately disposed about the pivotal axis of said manually positionable member, and an index cooperating with the indicia on said scale means, one of the above named scale and index portions of said indicia means being carried on said manually positionable member and the other being carried by said post, and a second bimetal element disposed substantially concentric of said post and cooperating with said scale means to indicate ambient temperature.

References Cited in the file of this patent

UNITED STATES PATENTS

| | | |
|---|---|---|
| 1,254,812 | Klein | Jan. 29, 1918 |
| 1,975,856 | McCabe | Oct. 9, 1934 |
| 2,060,713 | Wright et al. | Nov. 10, 1936 |
| 2,231,212 | Miller | Feb. 11, 1941 |
| 2,244,349 | Rickmeyer | June 3, 1941 |
| 2,315,533 | Malone | Apr. 6, 1943 |
| 2,329,442 | Popp | Sept. 14, 1943 |
| 2,624,819 | Spina et al. | Jan. 6, 1953 |